United States Patent
Morisse et al.

(10) Patent No.: US 10,265,907 B2
(45) Date of Patent: Apr. 23, 2019

(54) LOCKING DEVICE FOR A MOLDING UNIT FOR CONTAINERS OF THERMOPLASTIC MATERIAL

(71) Applicant: SIDEL PARTICIPATIONS, Octeville-sur-Mer (FR)

(72) Inventors: Jean-Francois Morisse, Octeville-sur-Mer (FR); Cedric Lemaire, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/693,003

(22) Filed: Aug. 31, 2017

(65) Prior Publication Data
US 2018/0065290 A1 Mar. 8, 2018

(30) Foreign Application Priority Data

Sep. 7, 2016 (FR) .................................. 16 58285

(51) Int. Cl.
*B29C 49/56* (2006.01)
*B29K 101/12* (2006.01)
*B29L 31/00* (2006.01)

(52) U.S. Cl.
CPC ........ *B29C 49/56* (2013.01); *B29C 2049/566* (2013.01); *B29K 2101/12* (2013.01); *B29L 2031/712* (2013.01)

(58) Field of Classification Search
CPC .................... B29C 49/56; B29C 2049/566
See application file for complete search history.

(56) References Cited

U.S. PATENT DOCUMENTS

| | | | |
|---|---|---|---|
| 4,834,642 A * | 5/1989 | Voss ...................... | B29C 33/202 264/532 |
| 5,346,386 A * | 9/1994 | Albrecht ............... | B29C 33/202 425/451.9 |
| 8,641,409 B2 * | 2/2014 | Hollriegl ................. | B29C 49/42 425/522 |
| 2008/0306529 A1 * | 12/2008 | Winslow ............ | A61B 17/7005 606/246 |
| 2009/0175978 A1 | 7/2009 | Hawkins et al. | |
| 2014/0008927 A1 * | 1/2014 | Rousseau ............ | B29C 49/4205 294/90 |
| 2014/0188172 A1 * | 7/2014 | Nichols .............. | A61B 17/7004 606/278 |

FOREIGN PATENT DOCUMENTS

| | | |
|---|---|---|
| EP | 2 292 406 A2 | 3/2011 |
| FR | 2 646 802 A1 | 11/1990 |
| FR | 2 764 544 A1 | 12/1998 |
| FR | 2 843 714 A1 | 2/2004 |

OTHER PUBLICATIONS

FR Search Report, dated May 5, 2017, from corresponding FR application No. 1658285.

\* cited by examiner

*Primary Examiner* — Robert B Davis
(74) *Attorney, Agent, or Firm* — Young & Thompson

(57) ABSTRACT

Disclosed is a locking device for a molding unit for containers of thermoplastic material. The device includes a lock with at least one locking pin, the at least one locking pin being made of polyetheretherketone (PEEK) and advantageously has at least one metal insert.

20 Claims, 2 Drawing Sheets

LOCKING DEVICE FOR A MOLDING UNIT FOR CONTAINERS OF THERMOPLASTIC MATERIAL

TECHNICAL FIELD OF THE INVENTION

The invention relates to a locking device for a molding unit for containers of thermoplastic material.

STATE OF THE ART

The invention relates more particularly to a locking device for a molding unit for containers of thermoplastic material having locking means that have at least one locking pin.

By way of nonlimiting example, the document FR-2,646, 802 describes an example of such a locking device for a unit for molding containers, in particular bottles.

From the state of the art, it is known to perform a lubrication of the locking pins of such a locking device of a molding unit in particular to reduce the friction occurring during the locking and consequently the associated phenomena of wear.

Lubrication of the locking pins is achieved by applying a lubricant such as grease or oil to them, but this has drawbacks.

Lubrication first of all requires a stopping of the manufacturing of containers to allow the intervention of an operator and this with a more or less high frequency.

Lubrication therefore has economic consequences; the duration of the stopping is all the more important the greater the number of molding units, for example between 20 and 40 units on some so-called rotary blow-molding machines.

The lubrication is then the cause of a "soiling" of the environment for manufacturing the containers.

Actually, the spraying of lubricant occurs in particular under the effect of centrifugal force when the molding units are mounted on a rotary blow-molding machine.

Now, generally, it is desired to maintain an environment for manufacturing containers that is ever cleaner as evidenced by the many means deployed from aeraulic protection of the environment to decontamination operations, in particular of the unit for filling the containers.

In the state of the art, the locking means and very particularly the locking pins are made of steel or steel alloys.

The metal materials such as steel are—for a person skilled in the art—the only materials that have mechanical properties, particularly strength, which are sufficient considering the considerable forces undergone by the locking means during the transformation of a preform into a container by blow molding or by stretch blow molding in the mold of a molding unit. Actually, the blow-molding pressures are generally between 20 and 40 bars, the pressure varying as a function of the applications.

It is for this reason that the person skilled in the art has attempted to eliminate the drawbacks connected with the lubrication by searching for surface treatments that are able to be used on metal materials, such as the steel used for the manufacturing of locking pins.

Thus, surface treatments of metal locking pins have been produced, in particular a "DLC"-type treatment, an English acronym for "Diamond-Like Carbon."

Such a treatment with carbon materials generally consists in obtaining—on the outside of the locking pins—a coating in the form of thin layers deposited by vacuum deposition techniques and intended to improve their properties, particularly to reduce friction and/or increase wear resistance.

Such a "DLC" treatment, however, is not satisfactory, on the one hand, because a lubrication remains necessary (even if its frequency is reduced) and, on the other hand, because such a treatment is particularly costly.

Also, it is difficult to control precisely the dimensions of the locking pins that have a "DLC"-type coating, which coating furthermore proves particularly fragile, in particular with impacts.

This invention in particular has as its object to remedy the above-mentioned drawbacks of the state of the art and to propose a solution that makes it possible to eliminate the lubrication of the locking pins.

BRIEF SUMMARY OF THE INVENTION

For this purpose, the invention proposes a locking device for a molding unit for containers of thermoplastic material, said device having locking means that have at least one locking pin, characterized in that said at least one locking pin is made of polyetheretherketone.

Advantageously, the use of polyetheretherketone or "PEEK" makes it possible to eliminate all lubrication of the locking pins.

The choice of using polyetheretherketone or "PEEK" goes against the technical biases of a person skilled in the art who, because of the forces resulting from the blow-molding pressures, to date has always sought solutions that can be used on locking pins made of steel or a steel alloy, by using new surface treatments like "DLC" that can be applied to such metal materials.

By comparison with the state of the art, the interventions of lubricating locking pins are completely eliminated, owing to which in particular, any soiling of the environment for manufacturing containers by the spraying of lubricant is eliminated.

Advantageously, also eliminated are the costs associated with said lubrication interventions that were formerly necessary, from costs connected to the stopping of the manufacturing to labor costs.

A locking pin made of polyetheretherketone (PEEK) advantageously has good dimensional stability, in particular with variations of temperature and of moisture.

Advantageously, the metal insert introduced into the locking pin made of polyetheretherketone makes it possible to obtain a resistance to the shear forces to which the pin is subjected in the locked position when a preform is transformed into a container by blow molding or by stretch blow molding in the molding unit.

Advantageously, a pin made of polyetheretherketone (PEEK) has a better impact resistance than a DLC coating, the impacts in particular being able to be absorbed by a deformation of the polyetheretherketone of the pin.

According to other characteristics of the invention:
the locking pin has at least one insert;
said at least one insert is mounted in at least one associated inner housing of the locking pin;
said at least one insert is press-fitted or attached by gluing in said inner housing;
said at least one inner housing extends over at least one portion of the pin;
the insert is arranged inside the locking pin so as to increase its resistance to shearing;
the insert is made of metal, in particular of steel or a steel alloy;
the device has at least one control element, such as a roller, to control selectively the locking means between at least one locked position and one unlocked position;

the control element is able to control means for driving the locking means that are mounted to slide between said locked and unlocked positions;

the drive means are connected in movement to said at least one locking pin by means of a connecting arm, one end of which is integral with said drive means and the other end of which is received in an opening of the locking pin.

BRIEF DESCRIPTION OF THE FIGURES

Other characteristics and advantages of this invention will emerge from reading the detailed description that follows for the understanding of which reference will be made to the drawings in which.

DETAILED DESCRIPTION OF THE FIGURES

In the following description, the longitudinal, vertical and transverse orientations will be adopted in a nonlimiting way with reference to the trihedron (L, V, T) shown in the figures.

By convention, the longitudinal and transverse directions are determined in a fixed way in relation to the mold carriers of a molding unit in such a way that the open or closed position that is occupied has no impact on said orientations.

Also, the terms "front" and "back" will be used in a nonlimiting way with reference to the longitudinal orientation, as well as "upper" and "lower" with reference to the vertical orientation, and finally "left" or "right" and "inside" or "outside" with reference to the transverse orientation.

Figure 1:
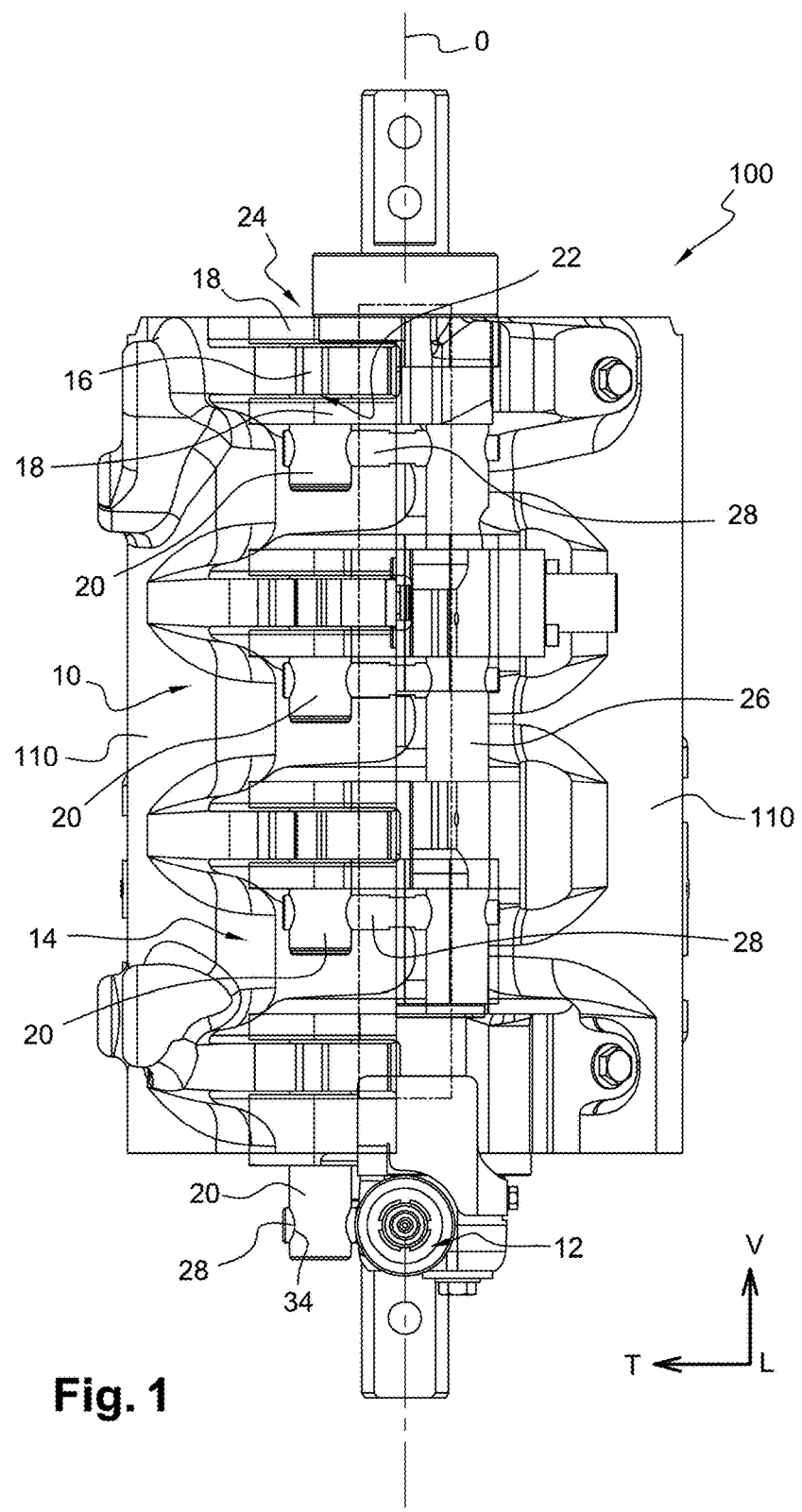
FIG. 1 is a front view that shows an embodiment of a locking device of a molding unit for containers in the closed position and that illustrates the locking pins of said device in the locked position.
Figure 2:
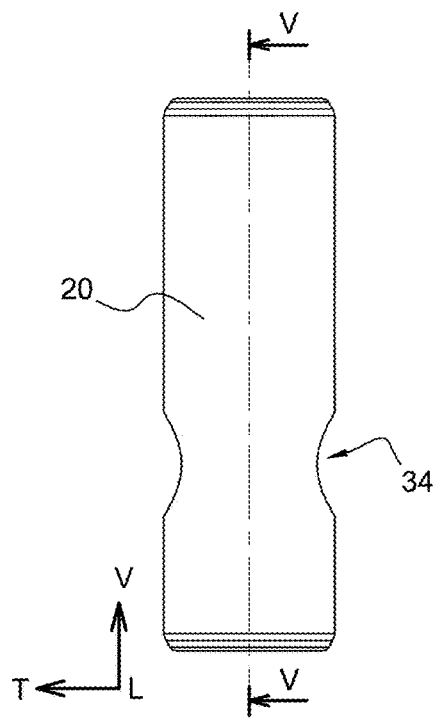
FIGS. 2 and 3 are respectively a front view and a cutaway view along a median vertical plane III-III of transverse orientation illustrated in FIG. 4, the views showing a locking pin for a locking device such as the one in FIG. 1 that, according to the invention, is made of polyetheretherketone, the cutaway view illustrating more particularly the insert housed inside the pin.

Shown in FIG. 1 is an embodiment of a locking device 10 for a molding unit 100 for containers of thermoplastic material.

In a known way, such a molding unit 100 is intended to be mounted on a carousel of a machine of the rotary type (not shown) for manufacturing containers.

The molding unit 100 then constitutes one of the molding stations of the machine that has a series of "n" molding units, distributed angularly in a uniform manner around the carousel of the machine.

Each molding unit 100 has a mold for manufacturing containers by blow molding or by stretch blow molding from hot preforms of thermoplastic material.

To do this, the molding unit 100 has blow-molding or stretch-blow-molding means (not shown); reference will be made to, for example, the document FR-2,764,544 for additional details on such means.

The molding unit 100 has two mold carriers 110 that are mounted to move in relation to one another between an open position and a closed position in which the molding unit 100 is shown in FIG. 1.

Preferably, the molding unit 100 is supported by a bracket intended to be securely connected onto a frame of the molding machine.

More specifically, the mold carriers 110 are made in the form of two carrying structures mounted to pivot around an axis O of rotation, the axis O of rotation extending here vertically along the trihedron (L, V, T).

Each mold carrier 110 has hinge means (not visible) that are arranged in back, in the longitudinal direction, of the molding unit 100.

Preferably, the mold carriers 110 are able to be separated mutually from one another by pivoting around the axis O of rotation respectively between said open and closed positions.

Because of these kinematics of the mold carriers 110, a molding unit 100 of this type is also called a "wallet" (or, in English, "book-like opening") mold.

By way of nonlimiting example, reference will be made to the document FR-2,843,714 that describes in particular control means to control by opening/closing a molding unit 100 of this type.

The locking device 10 of the molding unit 100 has at least one element 12 for controlling the locking means 14 of the mold carriers 110.

The locking device 10 is arranged longitudinally in the front part, or opposite the axis O of rotation and the means of the device for opening/closing the molding unit 100.

The locking device 10 is intended to ensure a locking of the two mold carriers 110 in the closed position so as to keep the molding unit 100 closed during the manufacturing of the container by blow molding or by stretch blow molding of a preform.

In the embodiment, the locking device 10 has two half-latches, respectively of the male type and the female type, which are combined with the mold carriers 110 and which are able to work together to keep the molding unit 100 in the closed position.

The locking device 10 has the function of preventing any opening of the mold carriers 110 so as to keep the parts of the mold perfectly joined during transformation operations by blow molding or stretch blow molding.

The half-latches each have at least one protruding arm, preferably here a plurality of single arms 16 for the half-latch of the mold carrier 110 on the left and a corresponding plurality of pairs of dual arms 18 for the half-latch of the mold carrier 110 on the right.

The single arms 16 and the dual arms 18 of the half-latches are directed transversely in the direction of one another and are mutually offset vertically so that, in the closed position as illustrated in FIG. 1, said single arms 16 and dual arms 18 engage with each other.

Thus, each arm 16 is received between the two dual arms 18 that are positioned vertically above and below.

Each of the arms 18 of the male-type half-latch supports a locking pin 20 sliding in the vertical direction.

Each single arm 16 of the female-type half-latch has an opening 22 that, extending vertically, passes through said single arm at its free end, and each dual arm 18 of the male-type half-latch has an opening 24 that, extending vertically, passes through said dual arm 18 at its free end.

In the closed position as illustrated in FIG. 1, for each single arm 16, the opening 22 of said single arm 16 and the openings 24 of said corresponding dual arms 18 are aligned in the vertical direction so that the corresponding locking pin 20 can pass through said openings 22, 24. The locking device 10 here has a total number of four locking pins 20.

The locking device 10 has drive means 26 that are connected in movement, here in sliding, to the locking pins 20.

The locking means 14 are mounted to move between at least one locked position and one unlocked position. More specifically, the locking means 14 have a movable part formed by said locking pins 20 and a stationary part formed by the single arms 16 and the dual arms 18 that have said openings 22 and 24.

Advantageously, each locking pin 20 is integral with a connecting arm 28 that is itself integral in movement with the drive means 26.

The sliding of the drive means 26 between the locked position (high position) shown in FIG. 1 and the unlocked position (low position) is controlled by the control element 12.

Preferably, the control element 12 is formed by a roller that is integral with the drive means 26. The drive means 26 consist of, for example, a shaft.

In the embodiment, the means 14 for locking device 10 of the molding unit 100 are mounted to move between at least one locked position in which the mold carriers 110 of the molding unit 100 are kept in the closed position by said locking means 14, and one unlocked position in which the mold carriers 110 are free to be separated from the closed position toward the open position.

The control element 12 consisting of the roller is intended to work with cam means that, complementary, are able to control the means 14 for locking the locking device 10 between said locked and unlocked positions.

The locking device 10 can have elastic return means (not shown) that are able to return automatically the locking means 14 toward one of said positions, advantageously toward the locked position.

The elastic return means are formed by, for example, a return spring through which the shaft forming the drive means 26 passes centrally and that rests at one of its ends on a ring and at the other end on a support attached to the drive means 26 and that carries the control element 12.

When the locking device 10 has such elastic return means, the molding unit 100 then advantageously has a blocking mechanism (not shown) that is associated with the locking device 10.

Such a blocking mechanism is intended to make possible a blocking of the locking means 14 in the unlocked position, said locking means 14, particularly the drive means 26, being otherwise automatically returned by the elastic return means toward the locked position.

Advantageously, the blocking mechanism has blocking means, such as a slide, which are able to be controlled selectively between an inactive position and an active blocking position in which said blocking means immobilize the locking means 14 in the unlocked position.

For further details on the structure and the operation of a locking device 10 having elastic return means as well as a blocking mechanism, reference can be made to, for example, the document EP-2,292,406.

The manufacturing rates of the machines for molding containers of thermoplastic material, such as bottles made of PET, are particularly high.

Actually, as a function of the number of molding units 100 of the machine and of the characteristics of the bottles manufactured, in particular their capacity, the manufacturing rates of the molding machines vary by, for example, about 20,000 bph (bottles per hour) up to more than 80,000 bph.

Consequently, the resistance to wear of parts such as the locking pins 20 of the locking device 10 is particularly important to guarantee the reliability of operation of the locking means 14.

Now, the stress on the locking pins 20 is considerable taking into account the repetition at such rates of successive locking and unlocking of each molding unit 100, the molding unit 100 alternating closed position and open position during the manufacturing cycle of a container such as a bottle.

This is the reason why solutions are sought to reduce in particular the friction between each locking pin 20 and said corresponding openings 22, 24 and by so doing to limit their wear.

Actually, wear of the locking pins 20 can cause the appearance of play in the locked position of the locking device 10 and so a separation of the parts of the mold during the manufacturing of the container.

Such play can thus lead, in the containers manufactured by the molding unit 100, to defects in the junction plane.

As explained in the introduction, the known solution of the state of the art consists in carrying out a lubrication of the locking pins so as to limit the friction and subsequently the wear of the locking pins.

However, such a lubrication has numerous drawbacks from soiling of the manufacturing environment by the lubricants used to the costs induced by the interventions of lubrication that require a stopping of the manufacturing and human means.

To eliminate these problems, the invention proposes a locking pin 20 made of polyetheretherketone (PEEK).

As a result of using locking pins 20 made of polyetheretherketone (PEEK) and with the properties of the material, the lubrication of the locking pins 20 is advantageously eliminated.

Shown in detail in FIGS. 2 to 5 is an embodiment of such a locking pin 20 made of polyetheretherketone (PEEK).

The locking pin 20 of polyetheretherketone (PEEK) is particularly, but not exclusively, able to be mounted in a locking device 10 of the type of that described previously with reference to FIG. 1 and that is given only by way of nonlimiting example.

Advantageously, the locking pin 20 has at least one insert 30 so as to increase the resistance to shearing of the locking pin 20.

Figure 3:
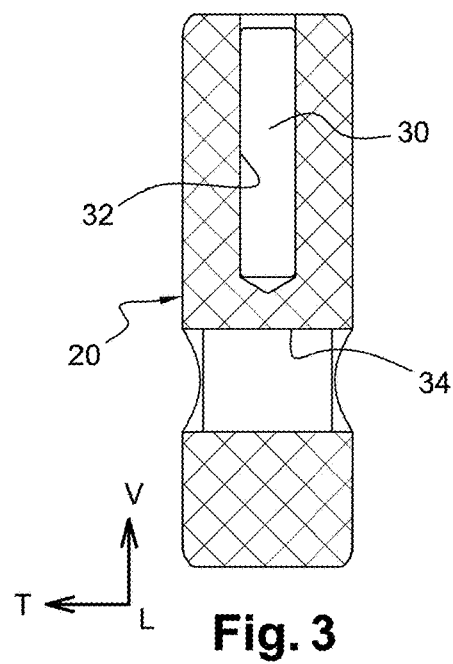
Figure 4:
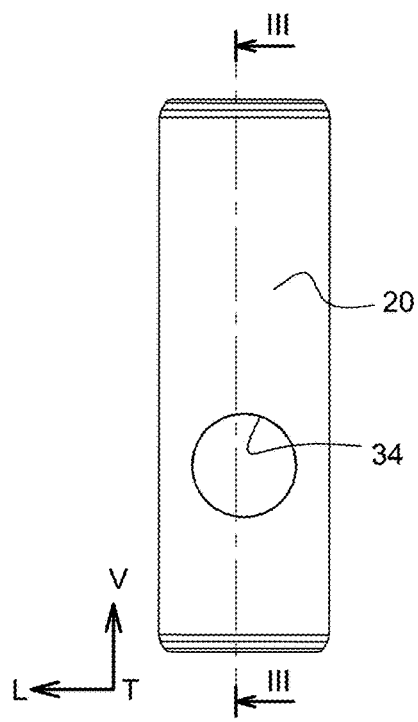
FIGS. 4 and 5 are respectively a side view and a cutaway view along a median vertical plane V-V of longitudinal orientation illustrated in FIG. 2 of a locking pin according to FIGS. 2 and 3.
Figure 5:
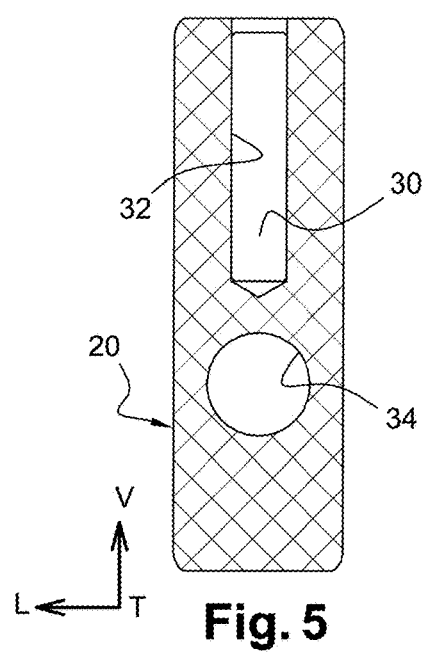

As illustrated by the cutaway views of FIGS. 3 and 5, said at least one insert 30 is arranged inside the locking pin 20.

In the embodiment, the locking pin 20 overall has a cylindrical shape, and the insert 30 extends along a main axis of the locking pin 20.

The insert 30 is arranged in the center of the locking pin 20 along said main axis and extends here in the vertical direction, i.e., in the direction of sliding of the locking pin 20 between said locked and unlocked positions.

In the embodiment, the locking pin 20 preferably has a single insert 30 having a general pin shape.

Preferably, the insert 30 is made of metal. Advantageously, the insert 30 is made of steel or from an alloy of steel.

The insert 30 is mounted in an inner housing 32 that is made in the locking pin 20. The housing 32 of the insert 30 is a blind hole that is, for example, obtained by a boring of the locking pin 20.

The insert 30 is, for example, force-fitted into said inner housing 32. As a variant, the insert 30 is attached by gluing to the interior of the inner housing 32 or by any other equivalent means that make it possible to block it, to immobilize it in position inside the inner housing 32.

In the embodiment, the inner housing 32 extends over at least one portion of the locking pin 20.

The insert 30 extends vertically over a portion of the locking pin 20 that corresponds to at least the portion of the locking pin 20 that enters into the locked position in the openings 24 of the dual arms 18 and in the opening 22 of the single arm 16 corresponding to said locking pin 20.

The locking pin 20 has an opening 34 in which is mounted one end of the connecting arm 28 with the shaft forming the drive means 26. The opening 34 is made in the other portion of the locking pin 20 that does not have said insert 30.

The housing 32 extends vertically, along the main axis of the locking pin 20, generally from a lower one of its ends to the vicinity of the other portion of the locking pin 20 having said opening 34.

Each connecting arm 28 is thus integral at one end of said drive means 26 and at the other end of the locking pin 20.

A locking pin 20 made of polyetheretherketone (PEEK) has a weight that is much less than that of a locking pin 20 made of steel.

The invention makes it possible to reduce the total weight of a molding unit 100 equipped with a locking device 10 that has locking pins 20 made of polyetheretherketone (PEEK).

Also improved therefore is the operation of a rotary-type molding machine having such molding units 100 by limiting the problems connected with inertia and that result from rotational drive speeds of the carousel necessary to reach ever higher manufacturing rates.

The invention claimed is:

1. Locking device (10) for a molding unit (100) for containers of thermoplastic material, said device (10) having locking means (14) that have at least one locking pin (20), wherein said at least one locking pin (20) is made of polyetheretherketone (PEEK).

2. Device according to claim 1, wherein the locking pin (20) has at least one insert (30).

3. Device according to claim 2, wherein said at least one insert (30) is mounted in at least one inner housing (32) associated with the locking pin (20).

4. Device according to claim 3, wherein said at least one insert (30) is force-fitted or attached by gluing in said inner housing (32).

5. Device according to claim 3, wherein said at least one inner housing (32) extends over at least one portion of the locking pin (20).

6. Device according to claim 2, wherein the insert (30) is arranged inside the locking pin (20) so as to increase its resistance to shearing.

7. Device according to claim 2, wherein the insert (30) is made of metal.

8. Device according to claim 1, wherein the device (10) has at least one control element (12) to control selectively the locking means (14) between at least one locked position and one unlocked position.

9. Device according to claim 8, wherein the control element (12) is able to control means (26) for driving the locking means (14) that are mounted to move by sliding between said locked and unlocked positions.

10. Device according to claim 9, wherein the drive means (26) are connected by movement to said at least one locking pin (20) by means of a connecting arm (28), one end of which is integral with said drive means (26) and the other end of which is received in an opening (34) of the locking pin (20).

11. The device of claim 8, wherein the control element is a roller.

12. Device according to claim 4, wherein said at least one inner housing (32) extends over at least one portion of the locking pin (20).

13. Device according to claim 3, wherein the insert (30) is arranged inside the locking pin (20) so as to increase its resistance to shearing.

14. Device according to claim 4, wherein the insert (30) is arranged inside the locking pin (20) so as to increase its resistance to shearing.

15. Device according to claim 5, wherein the insert (30) is arranged inside the locking pin (20) so as to increase its resistance to shearing.

16. Device according to claim 2, wherein the insert (30) is made of steel or an alloy of steel.

17. Device according to claim 4, wherein the insert (30) is made of metal.

18. Device according to claim 5, wherein the insert (30) is made of metal.

19. Device according to claim 6, wherein the insert (30) is made of metal.

20. Device according to claim 2, wherein the device (10) has at least one control element (12) to control selectively the locking means (14) between at least one locked position and one unlocked position.

* * * * *